United States Patent Office 3,400,240
Patented Sept. 3, 1968

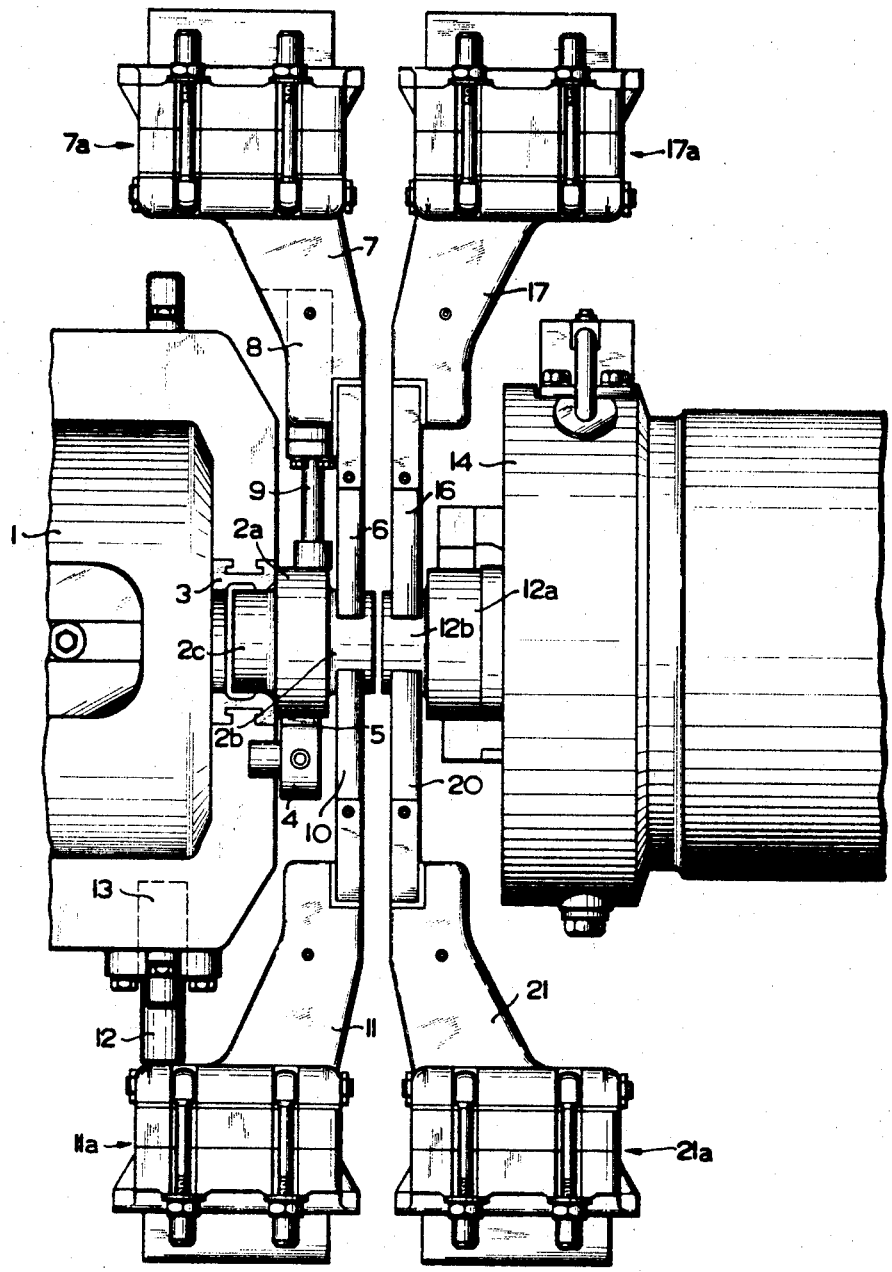

3,400,240
METHOD AND APPARATUS FOR CHUCKING WORKPIECES FOR ELECTRIC RESISTANCE WELDING EMPLOYING CONSTANT PRESSURE CONTACT JAWS
Eberhard Rietsch, Burscheid, Germany, assignor to Theodor Wuppermann Gesellschaft mit beschrankter Haftung, Leverkusen, Germany
Filed Dec. 30, 1964, Ser. No. 422,224
Claims priority, application Germany, Jan. 10, 1964, W 35,949
14 Claims. (Cl. 219—97)

ABSTRACT OF THE DISCLOSURE

A method and apparatus for chucking crankshaft sections to be flash welded involving engaging a web of a crankshaft section through the action of a fixed and a movable mechanical clamp and engaging a pin of the crankshaft section with a pair of welding current contact jaws. The pressure of the jaws on the pin is equalized by providing a pair of fluid pressure actuator stop means connected to a common source. Each stop means includes a cylinder and a piston. One of the stop means moves with a contact jaw and contains the movable clamp, the other stop means is mounted on the chucking means with its cylinder projecting into the path of the opposite actuator.

---

This invention relates to electric resistance flash welding and, more particularly, to a novel method of and apparatus for chucking crankshaft sections, or partial crankshafts, for weld uniting to each other to form a crankshaft.

A procedure used at present for weld-uniting, by electric resistance flash welding, crankshaft sections to form a crankshaft involves chucking and clamping the crankshaft parts to be weld united in position solely by the current carrying contact jaws. This has the advantage that, in a single operation, the parts are properly positioned, mechanically clamped, and electrically connected to the source of welding current. A disadvantage of this commonly used procedure is that separate and distinct contact jaws must be used for different sizes and shapes of crankshafts. These special contact jaws are costly to manufacture and, in addition, the changing of the contact jaws results in an undue "down time" of the welding apparatus. These disadvantages are particularly pronounced in the production of relatively heavy crankshafts wherein only a few crankshafts of a particular size and shape may be needed in any given run, and wherein the next run may involve an equally small number of crankshafts having a different size and shape.

For these reasons, it has been found advantageous to separate the function of mechanical chucking of the crankshaft sections from the function of electric current supply thereto. Thereby, the necessity of providing specially designed contact jaws, which are difficult to produce and thus expensive, is avoided. Thus, the two functions of mechanical chucking and welding current supply are assigned to two different elements or sets of elements.

The parts to be welded are held partly in an angular adjusting device, by which the relative angular orientation of the parts may be pre-set, and partly in a trough-shaped body which received the part of the crankshaft which has already been completed. The welding current contact jaws, connected to the welding transformer, serve only to supply the welding current to the parts to be welded, and do not have the additional function of clamping the parts in position. This latter procedure, in which the two functions are separated from each other and performed by separate elements, has the disadvantage, however, in that positioning of the parts, clamping of the parts, and supplying of current to the parts require separate operations.

An object of the present invention is to provide a method of weld uniting, by electric resistance flash welding, crankshaft sections, to form a crankshaft, combining the advantages of the two known procedures mentioned above while free of the disadvantages thereof.

Another object of the invention is to provide electric flash welding apparatus for weld uniting crankshaft sections to form a crankshaft, and combining the advantages of the apparatus mentioned above without the disadvantages thereof.

A further object of the invention is to provide a novel method of chucking crankshaft sections to be weld united by electric resistance flash welding.

Still another object of the invention is to provide a novel apparatus for chucking crankshaft sections, to be weld united by electric resistance flash welding to form crankshafts, and including novel means for assuring equalization of pressure of mechanical clamps and current carrying contact jaws on the sections to be welded.

Still a further object of the invention is to provide a novel electric resistance flash welding apparatus for weld uniting crank sections to form a crankshaft, in which the functions of mechanical clamping and electric current supply are separated from each other, and including novel means for effecting the mechanical clamping function.

In accordance with the invention, an electric resistance flash welding apparatus is provided including first and second relatively displaceable chucking means each arranged to have a respective crankshaft section, comprising a web and at least one projecting half-length pin, mounted therein, with respective pins projecting in coaxial aligned opposition for flash welding to each other. The apparatus includes a pair of welding current contact jaws engageable with the projecting pins of the crankshaft section mounted in the first chucking means, and a similar arrangement for the crankshaft section mounted in the second chucking means. With respect to the pair of contact jaws engageable with the projecting pin of the crankshaft section mounted in the first chucking means, conjointly actuated fluid pressure actuators are provided to advance these contact jaws toward each other to engage the associated pin, and a pair of mechanical clamps are provided which are engageable with the web of the crankshaft section. One of these clamps is movable toward the other clamp by one of the contact jaw actuators and, preferably, the other clamp is fixed on the first chucking means.

An important feature of the invention, as incorporated in the apparatus, comprises a pair of fluid pressure actuated stop means connected to a common source of fluid under pressure for equalized application of fluid pressure thereto, each of the stop means including a cylinder element and a piston element normally extended under fluid pressure from its associated cylinder element. One element of each stop means is fixed relative to a respective clamp, and the other element of each stop means is movable with a respective contact jaw.

In accordance with the chucking method of the invention, the fluid pressure actuators are activated to advance the respective contact jaws toward each other. As such advance is initiated, the projecting piston, which carries a clamping jaw, of the fluid pressure actuated stop means whose cylinder is secured to one of the actuators, engages the web of the crank shaft section mounted on the first chucking means. As the advance of the contact jaws toward each other continues, this projecting piston is forced back, under a constant fluid pressure, into its cylinder, while at the same time forcing the web of the crank shaft section into engagement with the fixed clamp. As the movable element of the fluid pressure actuator advancing the other contact jaw moves inwardly toward the crank shaft section mounted in the first chucking means, it engages the extended piston of the stop means having its cylinder fixed to the first chucking means, and thus fixed with respect to the stationary clamp mounted thereon, and this piston is forced inwardly in its cylinder. As the two cylinders are connected to a common source of fluid pressure, the force resisting inward movement of the two pistons is equal in both cylinders so that, as the contact jaws come into engagement with the projecting pin of the crank shaft section mounted in the first chucking means, the two jaws are pressed with exactly the same force, or with an equalized fluid pressure, against the pin of the crank shaft section.

For an understanding of the principles of the invention, reference is made to the following description of a typical embodiment thereof as illustrated in the accompanying drawings.

In the drawings, the single figure is a plan view of electric resistance flash welding apparatus including the novel chucking means embodying the invention.

Referring to the drawing, the welding apparatus includes a first chucking means in the form of a receiving trough 1 on which there is a support 3 which loosely receives one of the crank shafts sections to be welded, this being the completed crank shaft section which may comprise one or more webs and crank pins interconnecting the webs. As illustrated, each section initially includes a web 2a from which there project half-length crank pins 2b and 2c, each pin projecting from a respective opposite surface of web 2a. The pin 2c is loosely positioned in the support 3, and the pin 2b projects outwardly from the support. The crank shaft section is positioned in the support 3 in such a way that web 2a has a side surface portion bearing against a stop or clamp 4 which is fixedly mounted on the trough 1. This stop is pre-machined to size and preferably carries a replaceable jaw 5.

A prismatic electrically conductive metal contact jaw, such as a copper jaw 6 which is flat and narrow, supplies welding current to the crank shaft section through the pin 2b. Jaw 6 is secured in a suitable manner in a holder 7 which is the movable part of a fluid pressure actuator 7a. Holder 7, laterally of jaw 6, has a hydraulic cylinder 8 which actuates a piston or ram 9. A counter contact jaw 10, similar to the jaw 6, is secured in a holder 11 in symmetrical opposition to jaw 6. Holder 11 constitutes the movable part of a fluid pressure actuator 11a. On that side of trough 1 toward the holder 11, the trough is provided with a hydraulic cylinder 13 having the same dimensions as cylinder 8, and provided with a ram or piston 12. The length of ram 12 is so selected that jaw holder 11 strikes against it during chucking of the crank shaft section to be welded. Both cylinders, 8 and 13, are connected to the same or a common source of pressure fluid, such as a hydraulic accummulator.

The other crank section to be weld united to that supported in the holder 3 of trough 1 comprises parts substantially identical with those of the one just described. As shown, the other crank shaft section includes a web 12a, from one surface of which there extends a half-length crank pin 12b. This section is mounted in a suitable angularly adjustable second chucking means 14 so that the pins 2b and 12b may be placed in coaxial aligned opposition for weld uniting of their end surfaces to each other. For example, a crank shaft portion or a second half pin may project from the opposite surface of web 12a. Welding current is supplied to pin 12b through a contact jaw 16 connected to a holder 17 forming the movable element of a fluid pressure actuator 17a, and through a counter contact jaw 20 connected to a holder 21 forming the movable element of a fluid pressure actuator 21a.

In the operation of the apparatus, one crank section to be weld united is placed in the support 3, and the other crank section to be weld united to the one crank section is placed in the chucking means 14 and angularly adjusted to align pins 2b and 12b. Then the fluid pressure actuators 7a, 11a, 17a and 21a are activated to move the contact jaws 6 and 10 toward each other and the contact jaws 16 and 20 toward each other. During movement of jaw 6 toward pin 2b, ram or piston 9 initially engages web 2a and presses the latter against clamp jaw 5 on fixed clamp 4. The left-hand workpiece, as viewed in the drawing, is thus positioned and clamped. Upon further inward movement of jaw 6, ram 9 is forced back into cylinder 8 against the fluid pressure therein and thus acts like a constant force spring. The fluid pressure actuators 7a and 11a are energized from a common source of pressure fluid such as, for example, a pump circulating a hydraulic fluid.

One of the two jaws 6 or 10 engages the pin 2b before the other. No force is produced at first because the other jaw still has not contacted the pin 2b. It is only when both jaws 6 and 10 engage pin 2b that the fluid pressure operating the actuators 7a and 11a is fully effective to maintain firm contact of the jaws 6 and 10 with pin 2b.

However, before the condition of both jaws 6 and 10 engaging the pin 2b occurs, movable element 11 of fluid pressure actuator 11a will have engaged ram or piston 12 and forced this ram or piston back inwardly of cylinder 13. Since cylinder 13 has the same dimensions as cylinder 8, and since both cylinders are commonly connected to the same source of fluid under pressure, both pistons or rams, 9 and 12, have the same force resisting inward movement thereof. Consequently, the jaws 6 and 10 exert equal pressures against pin 2b, the pressure being a function of the difference between the pressure supplied to the fluid pressure actuators 7a and 11a and that applied to the cylinders 8 and 13.

The chucking device 14 is angularly adjustable because this device supports the element to be added to a partly completed crank shaft. Thus, angular adjustability is required in order that the proper angular relation between the webs and crank pins of the crank shaft can be attained. However, when all of the angularly displaced sections are weld united, which occurs when all of the shaft welding operatings are completed, angularly adjustable chucking means 14 may be replaced by a trough-shaped receiver similar to the trough-shaped receiver 1. In that case, the chucking arrangement shown in operative association with the trough 1 is used on the other trough in the same manner as described. During the time when the angularly adjustable device 14 is used, the then inactive fluid pressure actuators may be made ineffective in a known manner.

Aside from the specific chucking arrangement, the apparatus of the invention operates in the same fashion as does a regular electric resistance flash welding apparatus to abut the parts to be weld united under pressure while a relatively heavy current is flowing therethrough, and further to form an upset at the welded end surfaces of the pins 2b and 12b.

While a specific embodiment of the invention has been shown and described in detail to illustrate the application of the principles of the invention, it will be understood that the invention may be embodied otherwise without departing from such principles.

What is claimed is:

1. A method of chucking a metal workpiece for electric resistance flash welding to another metal workpiece, with mechanical clamping and current supply being effected independently of each other, said method comprising the steps of: positioning the workpiece between a pair of spaced mechanical clamps and between a pair of spaced current carrying contact jaws; conjointly effecting relative movement of the mechanical clamps toward each other and relative movement of the jaws toward each other, under a first pressure equalized as to both contact jaws, to engage the clamps with opposed lateral surface portions of the workpiece and to engage the contact jaws with other opposed lateral surface portions of the workpiece; engaging the mechanical clamps with said workpiece in advance of engagement of the contact jaws with said workpiece; and, responsive to engagement of the mechanical clamps with said workpiece, exerting a counter pressure, less than said first pressure, on the contact jaws, and equalized as to both contact jaws, whereby the contact jaws engage said workpiece with a pressure equal to the difference between said first pressure and said counter pressure.

2. A method of chucking a metal workpiece for electric resistance flash welding to another metal workpiece, with mechanical clamping and current supply being effected independently of each other, said method comprising the steps of: positioning the workpiece between a fixed mechanical clamp and a movable mechanical clamp, and between a pair of spaced current carrying contact jaws; conjointly effecting relative movement of the movable clamp toward the fixed clamp and relative movement of the jaws toward each other, under a first pressure equalized as to both contact jaws, to engage the clamps with opposed lateral surface portions of the workpiece and to engage the contact jaws with other opposed lateral surface portions of the workpiece; engaging the mechanical clamps with said workpiece in advance of engagement of the contact jaws with said workpiece; and, responsive to engagement of the mechanical clamps with said workpiece, exerting a counter pressure, less than said first pressure, on the contact jaws, and equalized as to both contact jaws, whereby the contact jaws engage said workpiece with a pressure equal to the difference between said first pressure and said counter pressure.

3. A method of chucking a metal crank shaft section, having a web and a half-length pin, for electric resistance flash welding to another metal crank shaft section having a web and a half-length pin, with mechanical clamping and current supply being effected independently of each other, said method comprising the steps of: positioning the crank shaft section between a fixed mechanical clamp and a movable mechanical clamp, and between a pair of spaced current carrying contact jaws; conjointly effecting relative movement of the movable clamp toward the fixed clamp and relative movement of the jaws toward each other, under a first pressure equalized as to both contact jaws, to engage the clamps with opposed lateral surface portions of the pin of the crank shaft section; engaging the mechanical clamps with the web in advance of engagement of the contact jaws with the pin; and, responsive to engagement of the mechanical clamps with the web, exerting a counter pressure, less than said first pressure, on the contact jaws, and equalized as to both contact jaws, whereby the contact jaws engage the pin with a pressure equal to the difference between said first pressure and said counter pressure.

4. Apparatus for chucking crank shaft sections, each including at least one web having at least one half-length pin projecting from a surface thereof, for electric resistance flash weld uniting of the half-length pins, said apparatus comprising, in combination, first and second relatively displaceable chucking means, each arranged to have a respective crank shaft section mounted therein, with respective pins projecting in coaxial aligned opposition for weld uniting to each other; a pair of welding current contact jaws engageable with the projecting pin on the crank shaft section mounted in said first chucking means; conjointly actuated fluid pressure actuators operable to advance said contact jaws toward each other into engagement with the associated pin; a pair of mechanical clamps engageable with the web of the crank shaft section mounted in said first chucking means, at least one of said clamps being movable toward the other clamp by one of said actuators; and a pair of fluid pressure actuated stop means connected to a common source of fluid under pressure for equalized application of fluid pressure thereto, each stop means including a cylinder element and a piston element with the two elements of each stop means being normally relatively extended under fluid pressure; one element of each stop means being fixed relative to a respective clamp for movment with such respective clamp, and the other element of each stop means being fixed relative to a respective contact jaw for movement with such respective contact jaw; whereby, as said contact jaws are advanced toward each other, the piston element of each stop means is forced into the associated cylinder element, with both piston elements being forced against the same fluid pressure, as said clamps engage the associated web, to equalize the pressure of said contact jaws on the associated pin.

5. Apparatus for chucking crank shaft sections for electric resistance flash weld uniting to each other, as claimed in claim 4, in which said welding current contact jaws are relatively narrow contact jaws.

6. Apparatus for chucking crank shaft sections for electric resistance flash weld uniting to each other, as claimed in claim 4, in which the other of said clamps is fixed to said first chucking means.

7. Apparatus for chucking crank shaft sections for electric resistance flash weld uniting to each other, as claimed in claim 4, in which one of said stop means is mounted on one of said actuators and carries said one clamp; the other of said stop means being mounted on said first chucking means in the path of movement of the movable element of the other fluid pressure actuator for engagement by such movable element; the other clamp being fixedly mounted on said first chucking means.

8. Apparatus for chucking crank shaft sections for electric resistance flash weld uniting to each other, as claimed in claim 7, in which the cylinder element of one stop means is secured to the movable element of one of said fluid pressure actuators and its piston element carries said one clamp; the cylinder element of the other stop means being mounted on said first chucking means and the piston element thereof extending into the path of movement of the movable element of the other fluid pressure actuator for engagement thereby.

9. Apparatus for chucking crank shaft sections for electric resistance flash weld uniting to each other, as claimed in claim 4, in which said first chucking means comprises a trough constructed and arranged to support a partially completed crank shaft with a web disposed outwardly of the trough toward said second chucking means; said second chucking means being constructed and arranged to support a crank shaft section for weld uniting to said partially complete crank shaft and being angularly adjustable to pre-set the correct angular relation between a pair of adjacent webs.

10. Apparatus for chucking crank shaft sections for electric resistance flash weld uniting to each other, as claimed in claim 4, in which said conjointly actuated fluid pressure actuators include first and second fluid pressure actuators each including a movable member having a respective contact jaw mounted thereon; said pair of mechanical clamps including a first clamp engageable with the web of the crank shaft section mounted in said first chucking means and fixedly mounted on said first chucking means on the side of said web toward one of said actuators, and a second clamp carried by the movable element of the other actuator whereby, as said fluid pressure actuators are activated, said second mechanical clamp will engage the web of the crank shaft section mounted in said first chucking means to displace the latter into firm engagement with said first mechanical clamp.

11. Apparatus for chucking crank shaft sections for electric resistance flash weld uniting to each other, as claimed in claim 10, including a replaceable clamping jaw interchangeably mounted in said first mechanical clamp for engagement with the web of the crank shaft section mounted in said first chucking means.

12. Apparatus for chucking crank shaft sections for electric resistance flash weld uniting to each other, as claimed in claim 10, in which one element of one stop means is mounted on the movable element of said other actuator and the other element of said one stop means carries one of said clamps; one element of the other stop means being mounted on said first chucking means and the other element of said other stop means being positioned in the path of movement of the movable element of said one actuator for engagement by the latter.

13. Apparatus for chucking crank shaft sections for electric resistance flash weld uniting to each other, as claimed in claim 10, in which the cylinder element of one stop means is fixed to the movable element of said other actuator and the piston element of said one stop means is fixed to one of said clamps; the cylinder element of the other stop means being fixedly mounted on said first chucking means and the piston element thereof projecting into the path of movement of the movable element of said one actuator for engagement thereby.

14. A method of chucking a metal crank shaft section, having a web and a half-length pin, for electric resistance flash welding to another metal crank shaft section, having a web and a half-length pin, with mechanical clamping and current supply being effected independently of each other, said method comprising the steps of: positioning the crank shaft section between a pair of spaced mechanical clamps and between a pair of spaced current carrying contact jaws; conjointly effecting relative movement of the jaws toward each other, under a first pressure equalized as to both contact jaws, to engage the clamps with opposed lateral surface portions of the web of the crank shaft section, and to engage the contact jaws with opposed lateral surface portions of the pin of the crank shaft section; engaging the mechanical clamps with the web in advance of engagement of the contact jaws with the pin; and, respective to engagement of the mechanical clamps with the web, exerting a counter pressure, less than said first pressure, on the contact jaws, and equalized as to both contact jaws, whereby the contact jaws engage the pin with a pressure equal to the difference between said first pressure and said counter pressure.

References Cited

UNITED STATES PATENTS

| 3,136,879 | 6/1964 | Waltonen | 219—89 |
| 3,080,471 | 3/1963 | Rietsch | 219—101 |
| 3,136,879 | 6/1964 | Waltonen | 219—89 |
| 3,167,637 | 1/1965 | Neukom et al. | 219—161 |

RICHARD M. WOOD, *Primary Examiner.*

C. CHADD, *Assistant Examiner.*